Sept. 7, 1937.    J. A. SCHARF ET AL    2,092,562
STOCK OPERATED WATER PUMPING DEVICE
Filed May 14, 1936    3 Sheets-Sheet 1
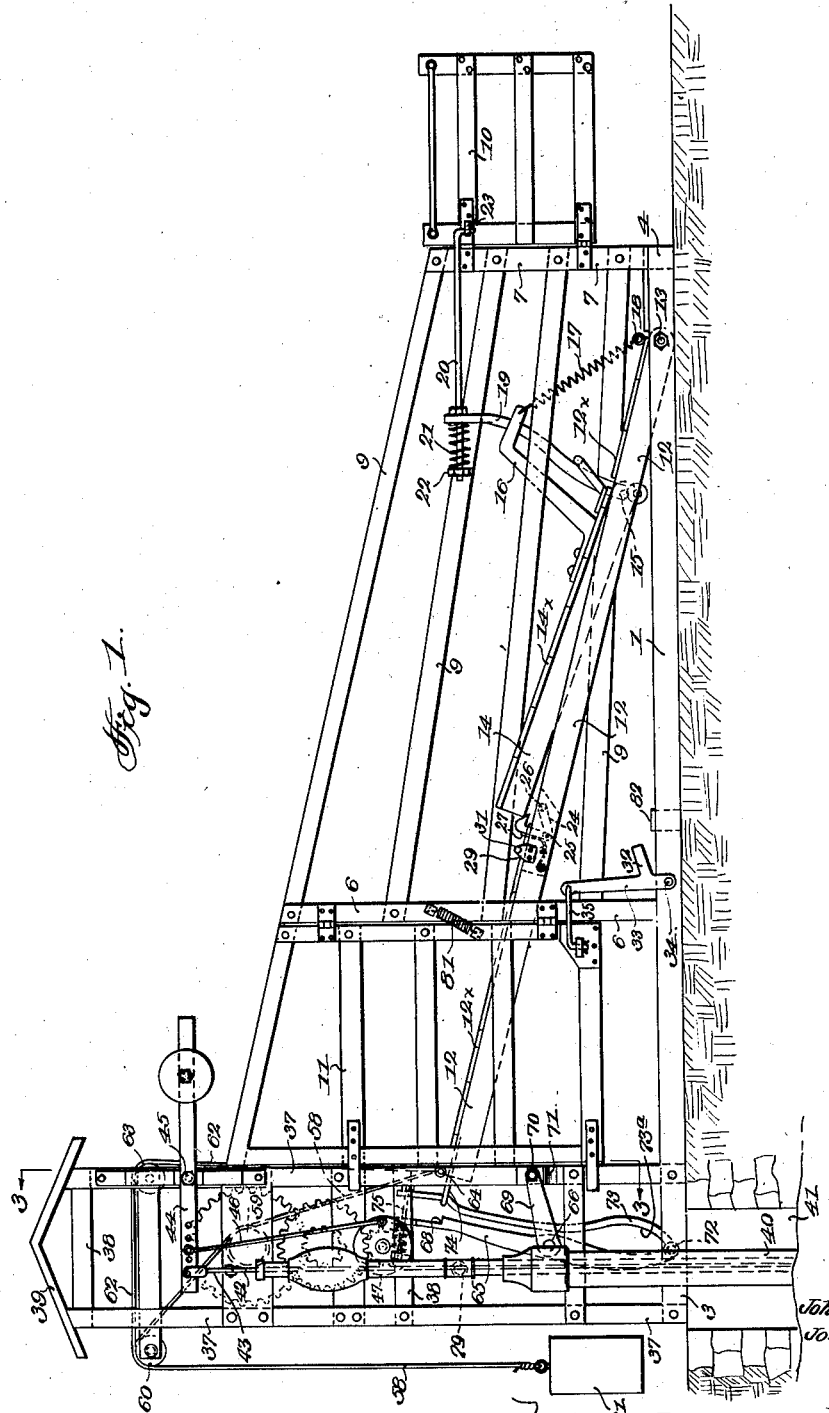
Inventors
John A. Scharf +
Joseph F. Scharf
By Merwin, Anderson & Liddy
Attorneys

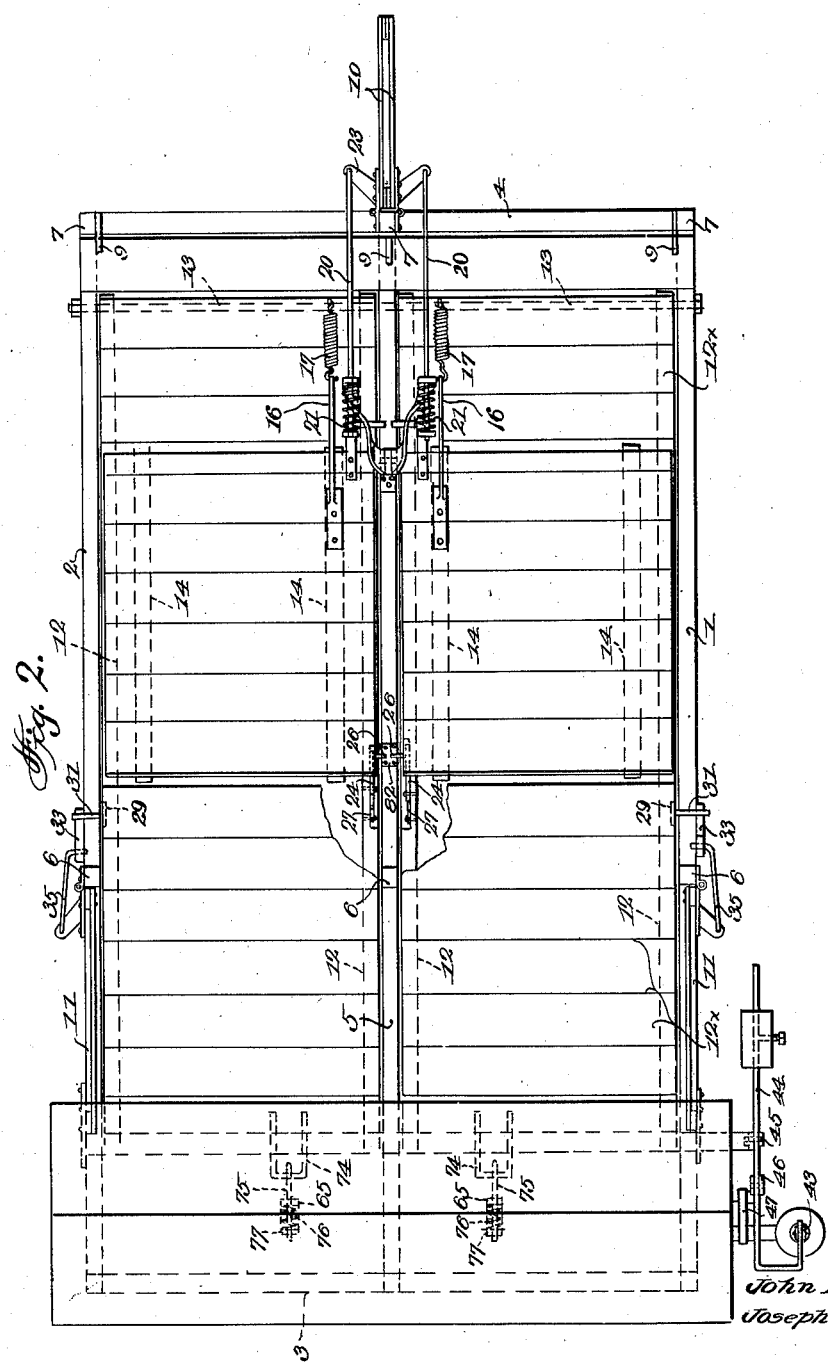

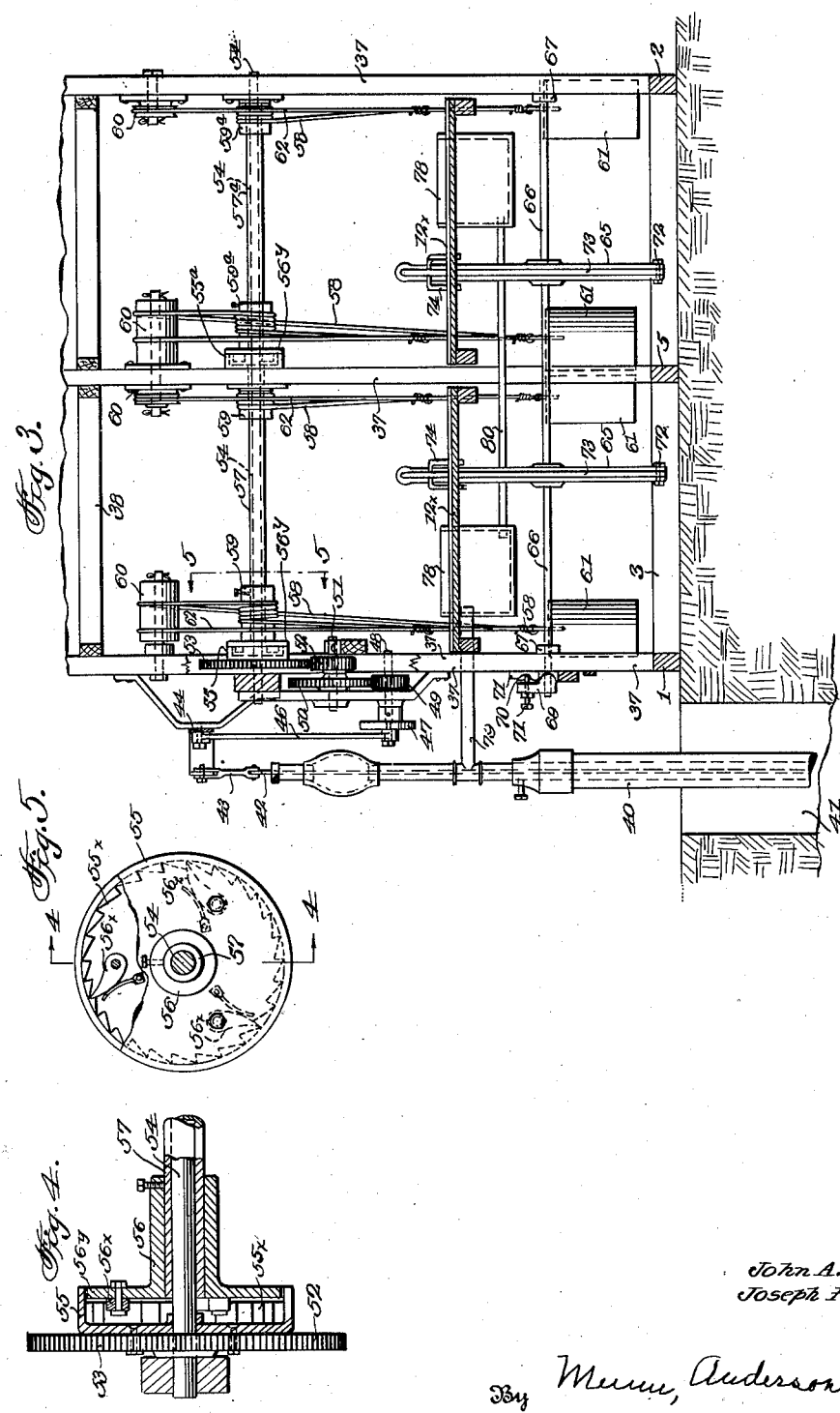

Patented Sept. 7, 1937

2,092,562

UNITED STATES PATENT OFFICE 2,092,562

STOCK-OPERATED WATER PUMPING DEVICE

John A. Scharf and Joseph F. Scharf, Richwood, Ohio

Application May 14, 1936, Serial No. 79,764

7 Claims. (Cl. 119—76)

Our invention relates to improvements in stock-operated water pumping devices, and it consists in the combinations, constructions, and arrangements herein described and claimed.

An object of the invention is to provide a device of the type by which stock, such as horses, cattle, or other animals, cause water to be pumped when they desire to drink, which will pump a limited amount of water from a well or other source of supply, and which will operate gates leading to and from the apparatus so as to insure against overcrowding on the apparatus and giving an animal opportunity to drink without molestation.

A further object of the invention is to provide a device of the type described in which a plurality of hinged ramps may be used for operating a single pump and in which adjacent ramps are alternately operated so as to actuate the pump for the full time for each animal.

A further object is to provide a device in which means is provided for locking a ramp against operation while the adjacent ramp is actuating the pump in its descent and in which the ascent of one ramp will release the adjacent ramp and thereby permit its operation.

A further object of the invention is to provide means for restoring the ramps to their original positions when the animal on the ramp has stepped off.

Other objects and advantages will appear in the following specification and the novel features of the invention will be particularly pointed out in the claims.

Our invention is illustrated in the accompanying drawings forming part of this application, in which:

Figure 1 is a side elevation showing one embodiment of the invention,

Figure 2 is a plan view of the device,

Figure 3 is a section along the line 3—3 of Figure 1,

Figure 4 is a section along the line 4—4 of Figure 5, certain actuating gears being included in the view, and Figure 5 is a section along the line 5—5 of Figure 3.

In carrying out our invention we provide a bottom frame consisting of side members 1 and 2, end members 3 and 4 and a central member 5. Mounted on this frame are uprights 6 and rear uprights 7 on each side of the device. Front and rear uprights 6 and 7 are also provided at the center as shown in Figure 2.

Side bars 9 extend from the uprights 6 to the rear uprights 7 to provide a pair of parallel pens, in the illustration given, it being understood that more pens might be provided if desired by extending the frame and putting in duplicate uprights and side bars.

At the rear end of each pen is hinged a gate such as that shown at 10 in Figure 1. A side gate 11 forms an extension to each of the pens, these gates being hinged to the uprights 6, as shown in the drawings.

A ramp 12 is provided for each pen. The side members of the ramp 12 are extended and are pivoted on a rod 13 which runs transversely across the pens and is carried by the frame members 1, 2 and 5, as shown in the drawings.

Each of the ramps 12 is provided with floor boards 12$^x$, as shown in Figures 1 and 2, but it will be noted from the drawings that there is an opening in the floor of each ramp 12 and that these openings are filled with auxiliary ramps 14 having floor boards 14$^x$. The auxiliary ramps are hinged to the main ramps at 15. Each auxiliary ramp has an arm 16 which is bent laterally at the top and which is connected with a spring 17 fastened to an eye 18 carried by the ramp 12. This tends to keep the auxiliary ramp in a position in which its floor is normally inclined upwardly with respect to the normal position of the floor of the ramp 12. An arm 19 is rigidly secured to the auxiliary ramp 14 and a rod 20 passes through the top of the arm 19. A spiral spring 21 bears on the arm 19 at one end and against an adjustable nut 22 at the other. The end of the rod 20 is bent to enter an eye 23 on the gate 10. It will be obvious that when the ramp portion 14 is moved downwardly the gate 10 will be swung into a closed position.

Below the forward end of the ramp portion 14 is a V-shaped latch member 24 which is pivoted at 25 on the side of the ramp 12. This latch member has a laterally projecting pin 26 and is normally urged toward a latching position by a spring 27. A bracket 29 is secured to the side of the ramp 12.

When the ramp portion 14 is moved downwardly relative to the main ramp 12 it engages the pin 26 on the V-shaped latch member which swings the upper end of the latch member over the end of the ramp portion 14 to lock it in position parallel with the floor of the main ramp 12.

As the ramp 12 is depressed, as will be explained later, a laterally extending pin 31 on the bracket 29 will engage the arm 32 on a lever 33 pivoted at 34 and will swing it clockwise in Figure 1. The lever 33 has a link 35 which is pivotally secured to the gate 11 and which opens the gate 11 when the ramp 12 is approaching its lower position.

As the ramp 12 descends the pin 26 on the latch 24 will engage the frame member 1 and this will cause the retraction of the V-shaped latch 24, thus releasing the ramp portion 14 which will be drawn upwardly by the spring 17.

Adjoining the pen is a framework consisting of uprights 37 connected by cross strips 38 and having a roof 39 which houses the pump mechanism and the gearing for operating it. This pump mechanism consists of a well casing 40 disposed in a well 41 or other suitable source of water. A sucker rod 42 extends downwardly, the top of this rod being secured to a link 43 (see Fig. 3) which is pivotally attached to a rocker arm 44 pivoted at 45 on a portion of the frame. The rocker arm 44 is connected by a pitman 46 with a crank 47 mounted in a shaft 48 (see Fig. 2). Rigidly secured to the crank and arranged to rotate therewith is a gear 49 in mesh with a gear 50 on a shaft 51 bearing a gear 52 (see Figs. 3 and 4). The gear 52 is in mesh with a gear 53 on a shaft 54. Secured to the gear 53 is a ratchet wheel 55. A hub 56 (see Fig. 4) is secured to a sleeve 57 which revolves on the shaft 54. The hub 56 bears spring-actuated pawls 56$^x$ which engage teeth 55$^x$ of the ratchet 55 to turn the shaft 54 as explained hereinafter but which will permit the rotation of the sleeve 56 in the opposite direction.

Secured at the free end of each of the main ramps 12 are cables such as that shown at 58 in Figure 1. Each cable 58 is wrapped around a drum 59 secured to the sleeve 57 and then is passed over a pulley 60 and thence to a weight 61. A second cable 62 is attached to the cable 58 near the weight and passes over the pulley 60, thence over a pulley 63 and is attached to an eye 64 on the ramp 12 where the cable 58 is also secured.

The sleeve 57 as shown in Figure 3 is mounted for revolution on the shaft 54 and the drums 59 are arranged in pairs, there being two drums (one on each side) over each ramp 12. Similarly the pulleys 60 are arranged in pairs as shown in Figure 3.

Drums 59$^a$ are secured to a second sleeve 57$^a$ on the shaft opposite the second ramp and sleeve 57 is secured to the ratchet wheel 55$^a$ so that either sleeve will cause operation of the gear 53. The mechanism in the wheel 55$^a$ is identical with that disclosed in Figures 4 and 5 for the ratchet wheel 55.

A lever 65 is rigidly secured to a shaft 66 which is in bearings 67 in the frame (see Fig. 3). This lever 65 has a shoulder 68, the purpose of which will be explained later. An arm 69 is rigidly secured to the shaft 66 to oscillate with the shaft. The arm 69 has an adjustable screw 70 (see Figure 3) which engages in recesses in a block 71 as the arm 69 is oscillated. In order to provide for this arrangement the arm 69 will give slightly in a direction parallel to the longitudinal axis of the rod 66.

Pivotally secured at 72 to the lever 65 is an arm 73 (see Figure 1), the upper portion of which extends through a U-shaped loop 74 secured to the end of the ramp 12. This arm has a rod 75 extending through it and also through the upper end of the lever 65. A spiral spring 76 bears at one end on the upper end of the lever 65 and at the other on a nut 77 which is adjustable along the rod so as to vary the tension of the spring 76.

From the foregoing description of the various parts the operation thereof may be readily understood. Normally as stated, the gates 10 are open as shown in Figure 1 while the gates 11 are closed. Also normally the ramp section 14 is slightly raised, as shown in Figure 1. An animal desiring to drink goes through the gate 10 and proceeds along the ramp section 14. The weight of the animal will cause the ramp section 14 to move downwardly and this movement will cause the closing of the gate 10 as has been already described, through the medium of the arm 19 and the link 20. When the ramp section 14 engages the latch 24 it will be held in locked position and the further progress of the animal toward the trough 78 which, as shown in Figure 3, is positioned at the end of the runway opposite the gate 10, will cause the downward movement of the ramp sections 14 and 12 about the pivot rod 13. Through the medium of the cable 58 the gearing will be driven so as to cause the reciprocation of the sucker rod of the pump and water will be pumped into the trough or container 78, so that the animal may drink. At this time the hind feet of the animal are still on the ramp 14.

As the ramp 12 moves downwardly the loop 74 will slide downwardly on the arm 73 and due to the bend in the lever will cause it to swing to the right in Figure 1. This will draw the rod 75 and also will swing the upper end of the lever 65 toward the right, thus rocking the shaft 66 and the arm 69. The locking bolt 70 (see Fig. 3) on the arm 69 will move from the position shown in Figure 3 to the lower recess so as to hold the lever 65 in position until it is released as hereinafter shown.

When the lever 65 swings to the right it will rotate the rod 66 as stated and the lever 65 of the adjacent pen will be swung to the right and its shoulder 68 will enter underneath the loop 74 of the ramp 12 in the adjacent pen, thus preventing the operation of the pump by an animal in the adjacent pen when said pump is being operated by the first animal. The water flows through the pipe 79 (see Fig. 3) and the troughs 78 are connected by a pipe 80 so that the water in both troughs is at the same height.

As the ramp portions upon which the animal is standing reach a lower position, the pin 31 on the bracket 29 will engage the arm 32 on the lever 33, thus swinging open the gate 11 against the tension of the spring 81. The latch 24 will be released by the engagement of a lug 82 with the pin 26 and the ramp section 14 will be swung to the position shown in Figure 1 by the spring 17 when the animal leaves the ramp section. However, the gate 10 will not be closed by this action since the rod 20 which operates the gate has been moved too far to the left in Fig. 1 by the depression of the ramp 12 to permit said rod to turn sufficiently in the opposite direction to close said gate. When the ramp 12 is released and it rises sufficiently the gate 10 will open.

The animal now is in a pen in which the gate 10 is closed and the gate 11 open so that when he has finished drinking he moves off from the ramp portion 12 through the gate 11. The weights 61 which have been drawn upwardly by the downward movement of the ramp section 12 now cause the reverse motion of the pawl bearing plate 56$^y$ carried by the hub 56 (see Figs. 4 and 5) allowing the pawls to ride idly over the teeth on the interior of the member 55. As soon as the arm 32 is released the spring 81 will cause the gate 11 to shut and when the ramp 12 has reached its uppermost position the gate 10 is swung open again.

The shoulder 68 which is associated with the first ramp 12 to be operated by an animal is normally in such position that the U-shaped member 74 will not be engaged by the shoulder when said U-shaped member is carried downwardly by the moving ramp through the weight of the animal. When the first ramp is being lowered the levers 73 will be pulled to the right thereby causing the lever 65 to be moved to the right so that the shoulder 68 of the lever 65 associated with the adjacent ramp will be located beneath the U-shaped member 74 of the second ramp so that if an animal should enter the second pen the shoulder 68 would prevent lowering of the ramp 12 of the second pen during the time that the first ramp was moving downwardly and thus prevent additional operation of the pump.

When the first ramp has been moved to its lowermost position and the pumping action has been completed by the downward movement of the first ramp the U-shaped member 74 will be moved in the inwardly curved portion 73a of the lever 73 so that the U-shaped member exerts a pull on the end of the lever 73. Therefore, the levers 73, the lever 65 and likewise the rod or shaft 66 will be rocked toward the left and release the second ramp whereby the weight of the animal in the second pen will force the ramp downwardly and operate the pumping mechanism.

In other words one ramp cannot be oscillated while another ramp is being moved downwardly. As soon, however, as the ramp which has been moved to approximately the lowermost point so that the U-shaped member 74 will be received by the curved portion 73a of the lever 73 the second ramp will operate since the lever 65 which has been holding the ramp in an inoperative position will be released.

It will thus be seen that I have provided means whereby an animal may enter the pen and cause the rear gate 10 to be closed by the downward movement or oscillation of the auxiliary ramp 14. The weight of the animal will cause the ramp 12 to descend and maintain the gate 10 closed due to the fact that the lever 19 will have moved the rod 20 too far to the left of Fig. 1 against the tension of the spring 21 to permit the rising of the ramp 14 to open the gate 10 even if the hind feet of the animal were removed from the ramp 14. After the animal has left through the open gate 11 the ramp 12 will rise after the upward movement of the ramp 14 and when the ramp 12 reaches a predetermined height sufficiently to permit the rod 20 to be moved to the right the gate 10 then will be open and in this way crowding of the pens will be prevented. It will be further seen that it will be impossible for a second animal to operate the pumping mechanism while the pumping mechanism is being operated by any ramp. When, however, the ramp as has been previously explained, reaches its lowermost level the other ramp will be released for descent so that the pumping mechanism will then again be actuated. When the member 74 passes below the horizontal plane through the pivot or the shaft 66 it will exert a pull on the lever 63 when it reaches the curved portion 73a so that the opposite end of the lever 65 will be positively moved to the left and force the shoulder 68 away from the U-shaped member 74 which has been holding its associated ramp in an elevated position.

We claim:

1. A stock-operated water pumping device comprising a pen, a normally open rear gate, a normally closed front gate, a pump, means disposed within the pen and actuated by the entrance of an animal for closing the rear gate, means within the pen for actuating the pump by the weight of the animal, and means for automatically opening the front gate at the conclusion of the operation of the pump.

2. A stock-operated water pumping device comprising a pen, a normally open rear gate, a normally closed front gate, a pump, a main hinged ramp within the pen for operating the pump, an auxiliary ramp pivotally mounted on said main ramp and adapted to be actuated by the weight of an animal for closing the rear gate, and means actuated by the downward movement of the main ramp under the weight of the animal for opening the front gate.

3. A stock-operated water pumping device comprising a pen, a normally open rear gate, a normally closed front gate, a pump, a main hinged ramp within the pen for operating the pump, an auxiliary ramp pivotally mounted on said main ramp and adapted to be actuated by the weight of an animal for closing the rear gate, means actuated by the downward movement of the main ramp under the weight of the animal for opening the front gate, means for returning both ramps to their original positions when the animal has left the pen, and means for closing the front gate and for opening the rear gate during the return movement of said ramps.

4. A stock-operated water pumping device comprising a pair of pens, a main ramp for each pen pivoted at one end, a pump, connections between each of said ramps and the pump for operating the pump by the weight of an animal, and means for locking one of said ramps in inoperative position while the ramp of the adjacent pen is being actuated.

5. A stock-operated water pumping device comprising a pair of pens, a main ramp for each pen pivoted at one end, a pump, connections between each of said ramps and the pump for operating the pump by the weight of the animal, means for locking one of said ramps in inoperative position while the ramp of the adjacent pen is being actuated and for releasing the locked ramp when the adjacent ramp has reached a predetermined lower position.

6. A stock-operated water pumping device comprising a plurality of pens, a main ramp disposed in each of said pens, each ramp being hinged at one end and constituting a runway in the pen for an animal, a pump, means connected with each ramp for operating said pump, said means comprising a rotatable drum for each pen, a cable secured to each ramp and being wrapped around its individual drum, gearing connected with the pump and actuated by the rotation of the drum in one direction, and a counterweight connected to said cable for raising said ramp when the animal steps off from the ramp.

7. A stock-operated water pumping device comprising a plurality of pens, a main ramp disposed in each of said pens, each ramp being hinged at one end and constituting a runway in the pen for an animal, a pump, means connected with each ramp for operating said pump, said means comprising a rotatable drum for each pen, a cable secured to each ramp and being wrapped around its individual drum, gearing connected with the pump and actuated by the rotation of the drum in one direction, and a counterweight connected to said cable for raising said ramp when the animal steps off from the ramp, said gearing including a pawl and ratchet mechanism for permitting the free rotation of the drum in the reverse direction.

JOHN A. SCHARF.
JOSEPH F. SCHARF.